US012737268B2

(12) United States Patent
Haid

(10) Patent No.: US 12,737,268 B2
(45) Date of Patent: Sep. 15, 2026

(54) SYSTEMS AND METHODS TO PRECONFIGURE A HARDWARE MODULE

(71) Applicant: STRATUS TECHNOLOGIES IRELAND LTD., Dublin (IE)

(72) Inventor: Steven Haid, Bolton, MA (US)

(73) Assignee: STRATUS TECHNOLOGIES IRELAND LTD. (IE)

( * ) Notice: Subject to any disclaimer, the term of this patent is extended or adjusted under 35 U.S.C. 154(b) by 105 days.

(21) Appl. No.: 18/399,475

(22) Filed: Dec. 28, 2023

(65) Prior Publication Data

US 2025/0130967 A1 Apr. 24, 2025

Related U.S. Application Data

(60) Provisional application No. 63/545,153, filed on Oct. 20, 2023.

(51) Int. Cl.
*G06F 11/20* (2006.01)
*G06F 11/14* (2006.01)

(52) U.S. Cl.
CPC ........ *G06F 11/203* (2013.01); *G06F 11/2023* (2013.01); *G06F 11/2028* (2013.01); *G06F 11/2038* (2013.01); *G06F 11/2048* (2013.01); *G06F 11/2094* (2013.01); *G06F 11/1417* (2013.01)

(58) Field of Classification Search
None
See application file for complete search history.

(56) References Cited

U.S. PATENT DOCUMENTS

| | | | |
|---|---|---|---|
| 6,355,991 | B1 | 3/2002 | Goff et al. |
| 6,633,996 | B1 | 10/2003 | Suffin et al. |
| 6,687,851 | B1 | 2/2004 | Somers et al. |
| 6,691,225 | B1 | 2/2004 | Suffin |
| 6,691,257 | B1 | 2/2004 | Suffin |
| 6,708,283 | B1 | 3/2004 | Nevin et al. |
| 6,718,474 | B1 | 4/2004 | Somers et al. |

(Continued)

OTHER PUBLICATIONS

Dong et al., "COLO: COarse-grain LOck-stepping Virtual Machine for Non-stop Service", SoCC'13, Oct. 1-3, 2013, Santa Clara, California, USA, ACM 978-1-4503-2428-1; 16 pages.

(Continued)

*Primary Examiner* — Elias Mamo
(74) *Attorney, Agent, or Firm* — K&L GATES LLP

(57) ABSTRACT

In part, in one aspect, the disclosure relates to a method of enabling hot plugging operations in a computer system. The method mat include initializing a platform driver, wherein the platform driver is installed on a computer system running an operating system; disabling, using the platform driver, an interrupt function and a hardware detection notification function of the computer system; hot plugging a PCIe node in the computer system; detecting, using the platform driver, the hot plugging of the PCI node in the computer system; configuring the PCIe node, using the platform driver, wherein the configured PCIe node comprises a PCI hierarchy, the PCI hierarchy comprising an allocation of PCI bridges and devices of the configured PCIe node; and bringing the devices of the hot plugged configured PCIe node into service for use by the computing system.

19 Claims, 3 Drawing Sheets

(56) References Cited

U.S. PATENT DOCUMENTS 6,766,413 B2 7/2004 Newman
6,766,479 B2 7/2004 Edwards
6,802,022 B1 10/2004 Olson
6,813,721 B1 11/2004 Tetreault et al.
6,842,823 B1 1/2005 Olson
6,862,689 B2 3/2005 Bergsten et al.
6,874,102 B2 3/2005 Doody et al.
6,886,171 B2 4/2005 Macleod
6,928,583 B2 8/2005 Griffin et al.
6,948,010 B2 9/2005 Somers et al.
6,970,892 B2 11/2005 Green et al.
6,971,043 B2 11/2005 McLoughlin et al.
6,996,750 B2 2/2006 Tetreault
7,065,672 B2 6/2006 Long et al.
7,200,694 B2 * 4/2007 Yakovlev ............ G06F 13/4081 710/48
7,496,786 B2 2/2009 Graham et al.
7,496,787 B2 2/2009 Edwards et al.
7,669,073 B2 2/2010 Graham et al.
7,784,058 B2 * 8/2010 Rochette ............ G06F 9/44563 719/310
7,877,521 B2 * 1/2011 Suzuki ................ G06F 13/4081 710/10
7,904,906 B2 3/2011 Puthukattukaran et al.
7,958,076 B2 6/2011 Bergsten et al.
8,117,495 B2 2/2012 Graham
8,161,311 B2 4/2012 Wiebe
8,234,521 B2 7/2012 Graham et al.
8,271,416 B2 9/2012 Al-Biek et al.
8,312,318 B2 11/2012 Graham et al.
8,381,012 B2 2/2013 Wiebe
8,812,907 B1 8/2014 Bissett et al.
9,251,002 B2 2/2016 Manchek et al.
9,588,844 B2 3/2017 Bissett et al.
9,626,207 B2 * 4/2017 Graham .............. G06F 9/45558
9,652,338 B2 5/2017 Bissett et al.
9,760,442 B2 9/2017 Bissett et al.
10,067,900 B2 * 9/2018 Watkins ................ G06F 13/362
10,216,598 B2 2/2019 Haid et al.
10,360,117 B2 7/2019 Haid et al.
10,423,560 B2 * 9/2019 Peng .................. G06F 13/4282
10,853,299 B2 * 12/2020 Bolen ................. G06F 13/4081
11,288,143 B2 3/2022 Horvath et al.
11,586,514 B2 2/2023 Pawlowski et al.
2001/0042202 A1 11/2001 Horrath et al.
2002/0016935 A1 2/2002 Bergsten et al.
2002/0070717 A1 6/2002 Pellegrino
2003/0046670 A1 3/2003 Marlow
2003/0095366 A1 5/2003 Pellegrino
2006/0222125 A1 10/2006 Edwards et al.
2006/0222126 A1 10/2006 Edwards et al.
2006/0259815 A1 11/2006 Graham et al.
2006/0274508 A1 12/2006 LaRiviere et al.
2007/0011499 A1 1/2007 Begsten et al.
2007/0028144 A1 2/2007 Graham et al.
2007/0038891 A1 2/2007 Graham
2007/0106873 A1 5/2007 Lally et al.
2007/0174484 A1 7/2007 Lussier et al.
2008/0222335 A1 * 9/2008 Abumi ................ G06F 13/4081 710/302
2009/0249129 A1 10/2009 Femia
2015/0205688 A1 7/2015 Haid et al.
2015/0263983 A1 9/2015 Brennan et al.
2017/0324609 A1 11/2017 Hong et al.
2018/0046480 A1 2/2018 Dong et al.
2018/0143885 A1 5/2018 Dong et al.
2021/0034447 A1 2/2021 Horvath et al.
2021/0034464 A1 2/2021 Dailey et al.
2021/0034465 A1 2/2021 Haid et al.
2021/0034483 A1 2/2021 Haid
2021/0034523 A1 2/2021 Dailey
2021/0037092 A1 2/2021 Cao
2023/0185681 A1 6/2023 Pawlowski et al.
2023/0291721 A1 9/2023 Robinson
2024/0176739 A1 5/2024 Alden et al.

OTHER PUBLICATIONS

Dong et al., "COLO: COarse-grain LOck-stepping Virtual Machine for Non-stop Service", https://www.linux-kvm.org/images/1/1d/Kvm-forum-2013-COLO.pdf; 24 pages.

* cited by examiner

SYSTEMS AND METHODS TO PRECONFIGURE A HARDWARE MODULE

CROSS REFERENCE TO RELATED APPLICATIONS

This application is a U.S. patent application which claims priority to and the benefit of U.S. Provisional Patent Application No. 63/545,153, filed on Oct. 20, 2023.

FIELD

This disclosure relates generally to computing systems with high availability requirements.

BACKGROUND

Various operating systems and computer system lack features to support hot insertion of devices. The disclosure addresses some of the challenges associated with the lack of support for such features and others.

SUMMARY

In one aspect, an operating system may support a hot plug insertion of a peripheral component interconnect express (PCI-E or alternatively PCIe) hardware module or node only if the PCI-E hardware module or node is preconfigured. In one aspect, such an operating system may reject a PCI-E hardware module or node if the hardware module or node has not been preconfigured. In various legacy systems, a PCI-E hardware module or node is physically connected at boot in order for such to be configured. However, in part, in one aspect, disclosed herein is a method to preconfigure a PCI-E hardware module or node absent from a computer system during boot such that the hardware module or node may be hot plugged and recognized by a live, running operating system supporting only preconfigured PCI-E nodes/modules or otherwise lacks hot insertion or hot swappable functionality.

In part, in one aspect, the disclosure relates to a method of enabling hot plugging operations in a computer system. The method mat include initializing a platform driver, wherein the platform driver is installed on a computer system running an operating system; disabling, using the platform driver, an interrupt function and a hardware detection notification function of the computer system; hot plugging a PCIe node in the computer system; detecting, using the platform driver, the hot plugging of the PCI node in the computer system; configuring the PCIe node, using the platform driver, wherein the configured PCIe node comprises a PCI hierarchy, the PCI hierarchy comprising an allocation of PCI bridges and devices of the configured PCIe node; and bringing the devices of the hot plugged configured PCIe node into service for use by the computing system.

In some embodiments, the PCIe node includes hardware that is hot pluggable into the computer system. In many embodiments, the PCIe node is not preconfigured. In various embodiments, the interrupt function is a hot plug interrupt function. In some embodiments, the hardware detection notification function is a presence detect changed notification function. In various embodiments, the platform driver communicates with a PCIe root port of a central processing unit of the computer system to disable the hot plug interrupt function and the detection notification function. In various embodiments, the step of detecting the inserting of the PCI node includes polling a PCIe presence detect state bit of the computer system.

In various embodiments, the method further includes enabling the interrupt function and the hardware detection notification function of the computer system. In many embodiments, the method further includes triggering a detection of a hot plug interrupt and provision of a presence detect changed notification to the operating system. In some embodiments, the triggering step includes disabling the interrupt function and the hardware detection notification function of the computer system. In various embodiments, the enabling, using the platform driver, an interrupt function and a hardware detection notification function of the computer system step is performed temporarily or for a brief time period to support detection of a hot plugged device.

In some embodiments, the method further includes processing the hot plug interrupt using the operating system. In various embodiments, the method further includes detecting configuration of the PCIe node using the operating system. In some embodiments, the computer system is operable to support PCIe root port resource padding. In various embodiments, the change in the presence detect state bit indicates hot plugging of the unconfigured PCIe node. In some embodiments, detecting, using the platform driver, the hot plugging of the PCI node in the computer system further includes polling a PCIe presence detect state bit using the platform driver.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

BRIEF DESCRIPTION OF THE DRAWINGS

The structure and function of the disclosure can be best understood from the description herein in conjunction with the accompanying figures. The figures are not necessarily to scale, emphasis instead generally being placed upon illustrative principles. The figures are to be considered illustrative in all aspects and are not intended to limit the invention, the scope of which is defined only by the claims.

DETAILED DESCRIPTION

Figure 1A:
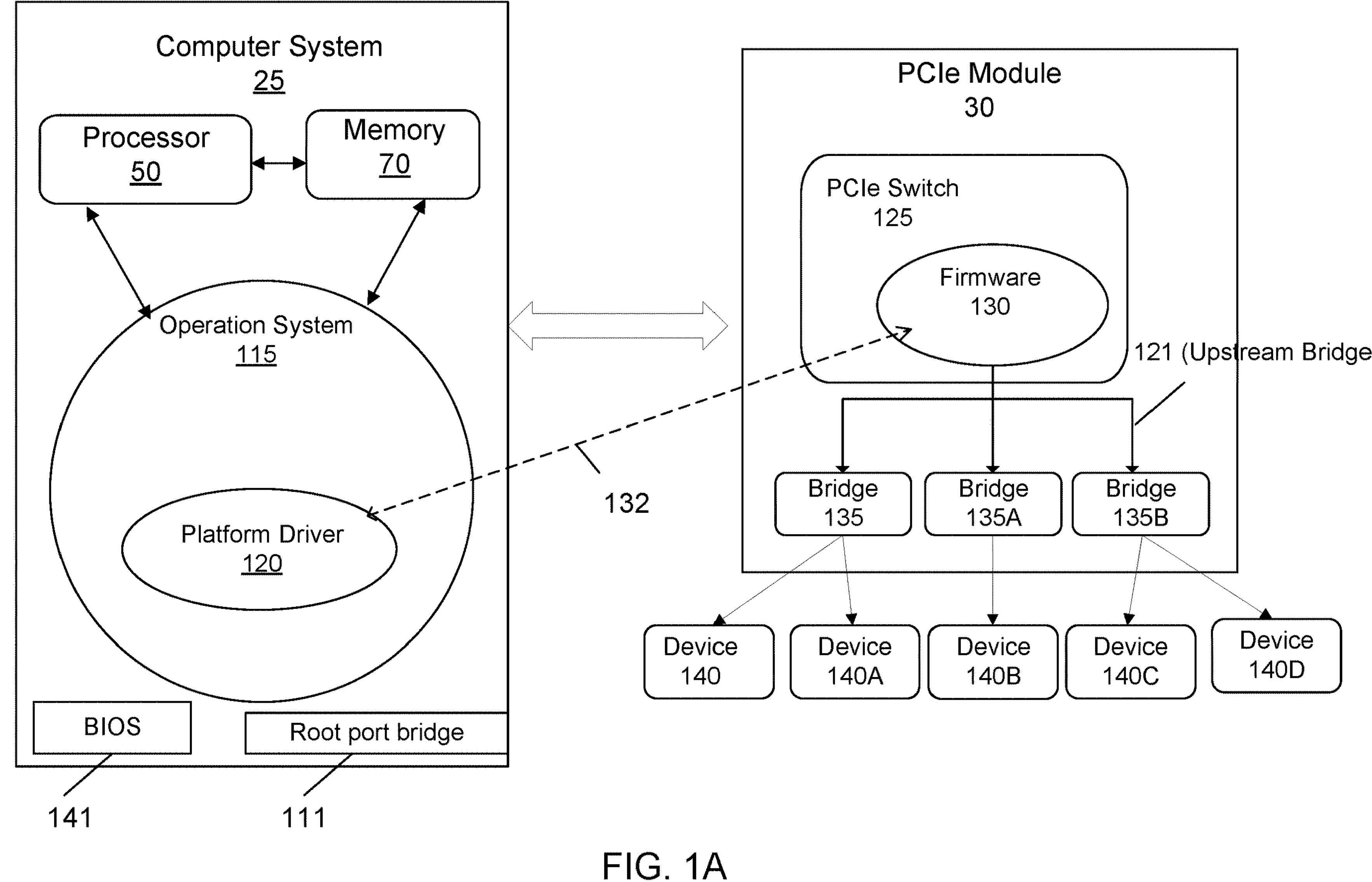
FIG. 1A is a block diagram of computer system and peripheral component interconnect express (PCIe) module in accordance with the disclosure

Modern computer systems can have removable and insertable hardware modules or nodes such as PCIe modules or nodes that may include and releasably connect to PCIe switches and PCI devices. PCIe modules or nodes are desirable in various systems because they provide an interface for connecting high-speed input output (HSIO) components. Some operating systems do not support insertion of PCIe modules during run time, because they only support hot plug insertion of preconfigured PCIe devices. The disclosure provides a process and systems in which PCI devices may be recognized or self-enumerated by computer hardware such as PCI modules and/or PCIe switches in the IO modules so that an operating system can recognize, use, and manage the PCI bridges and all the PCI devices connected in the running system.

In various embodiments, the disclosure may support this functionality including device recognition and management even if the operating system does not support recognizing and managing device such as through a native hot plugging or insertion functionality or feature. Embodiments of the disclosure are suitable for use with operating systems that require preconfiguring of PCIe devices. References to nodes may also cover modules such as hardware modules (and vice versa). Similarly, references to compute nodes may also cover computer systems or other processor-based systems (and vice versa).

The system and methods of the disclosure applies generally to various computer systems including a high reliability fault tolerant computer system although that is not the only use case. In some embodiments, the disclosure provides modifications and workarounds to achieve hot plug support such as PCIe hot plug support with regard to operating systems, other software, and hardware that does not natively support such functionality or that require preconfiguring of PCIe devices for them to be detected and used. Some examples of operating systems that may not support hot plug support (or hot swapping of such devices) for PCI or PCIe devices may include Elastic Sky X (ESX), Elastic Sky X integrated (ESXi), Linux-based operating systems, virtualized operating systems, and others as may exist now or in the future that do not support hot plugging functionality or only support such functionality with various requirements such as device pre-configuration.

In some embodiments, the systems and methods disclosed herein allows an operating system that only supports preconfigured PCIe nodes to accept and use a hot-plugged PCIe device that has not been preconfigured. In many embodiments, a BIOS preconfigures a device or PCIe node that is present at boot so that when an operating system loads, the operating system recognizes the preconfigured PCIe node. In some embodiments, a device may be prepared, configured, or preconfigured by a method disclosed herein that is distinct from a normal BIOS-initiated preconfiguring process at boot time. In various embodiments, the method configures a hot plugged PCIe node while an operating system is already live and running. In many embodiments, a hot plug event may include an attaching of a PCIe node previously unseen by the operating system, such as a PCIe node not present during boot time and so not preconfigured by the BIOS, or the removal—even of a preconfigured node—and subsequent reattachment of the same node.

In many embodiments, the method prevents the operating system from rejecting a previously unconfigured PCIe node by disabling PCIe node insertion notifications in a PCIe root port. In some embodiments, with PCIe node insertion notifications disabled on the PCIe root port, a platform driver implementing the method disclosed herein may detect a PCIe node insertion event, configure the PCIe node. Finally, the platform driver may then send a PCIe node insertion notification to the operating system, or enable or temporarily enable PCIe node insertion notifications on the PCIe root port. In many embodiments, having received a PCIe node insertion notification, the operating system will bring the inserted PCIe node into service.

In some embodiments, the operating system may be an ESX operating system, an ESX8 operating system, or other operating system as disclosed herein or that does not support detecting or managing a PCIe hardware node or module. In some embodiments, the disclosed method may be used to work around bugs in a PCIe enumeration process of an operating system, even if the operating system officially supports hot plugging of PCIe nodes. In various embodiments, a PCIe node may include an individual device such as a storage device, a network interface device, or other device. A PCIe node may include a PCIe bridge or a hierarchy of devices. In some embodiments, detecting a PCIe device may include polling a PCIe presence detect state bit.

Refer now to the example embodiment of FIG. 1A. FIG. 1A depicts a computer system 25 and a PCIe module 30 or other device interface hardware modules that are operably connected and configured to exchange data. In some embodiments, computer system 25 is part of a general computing system or a fault tolerant system that may include a second computer system that is substantially the same as computer system 25. The computer system 25 may include various components such as processor 50 and memory 70 and communication or data exchange channels and buses. The computer system 25 includes an operating system 115 with a platform driver 120. The platform driver is configured to support and perform one or more of the steps/operations described herein. In various embodiments, the operating system 115 runs or executes or exchanged threads or data with the processor 50 and stores and retrieves data from memory 70 such as random access memory. The computer system may also include or connect to other memory storage such as disks or disk arrays. Some of the disks may connects the computer system 25 by being connected to the PCIe module 30 or a dedicated storage module. One of the bridges is shown as upstream bridge 121 in FIG. 1B. Computer system 25 may also include a BIOS 141 in various embodiments.

Once a communication channel 132 is established, the platform driver 120 sends the PCI memory range of the root bridge of the PCIe 125 switch to the PCIe switch firmware 130. In various embodiments, the firmware 130 is modified to perform one or more of the processes and operation disclosed herein (or portions thereof). In some embodiments, the root bridge is a hardware component such as an ASIC or chipset that creates a PCI bus that serves as the primary or physical parent bus for a set of device that share a common PCI interface for inputs and outputs and a common PCI memory and configuration space. In some embodiments, the computer system 25 and/or the module 30 may include or connect to a PCI host bus controller that includes one or more PCI root bridges. In various embodiments, each PCI root port bridge/root bridge 111 corresponds to a local PCI bus that may include devices on the PCI slots of the PCIe module or other hardware. In addition, the computer system 25 includes a BIOS that may be modified to perform some of the steps and operations disclosed herein.

In many embodiments, the PCIe module 30 includes a PCIe switch 125 that includes firmware 130 that manages the bridges 135, 135A, and 135B. These bridges are PCIe bridges in various embodiments and are generally referred to as such herein. In some embodiments, other bridges that support peripherals or other devices used by a computer system or other hardware may be used. Each PCIe bridge 135 may communicate with one or more PCIe devices 140, 140A, 140B, 140C, and 140D. In various embodiments, the PCIe module 30 and its components may be implemented using one or more chipsets that are in electrical communication with the processor 50 and memory 70 and other hardware components and buses that connect to a motherboard or other hardware of the computer system 25. The platform driver 120 may handle various data exchanges between the kernel of the operating system 115 and other steps and operations as described herein. In various embodiments, the platform driver 120 establishes a communication channel 132 with firmware 130 of the PCIe module 30/PCIe node 123.

In various embodiments, the hardware, software, and firmware components of the computer system 25 and PCIe module 30 may be communicably and operatively coupled to each other using buses, data channels and other connections or links as shown by the double-headed arrows, single headed arrows, and straight line connection all of which may support transmitting, receiving, and exchanging of data, values, signals, instructions, messages, and similar hardware-based and software-based communications. Additional details relating to preconfiguring a hardware module are discussed in more detail below.

Figure 1B:
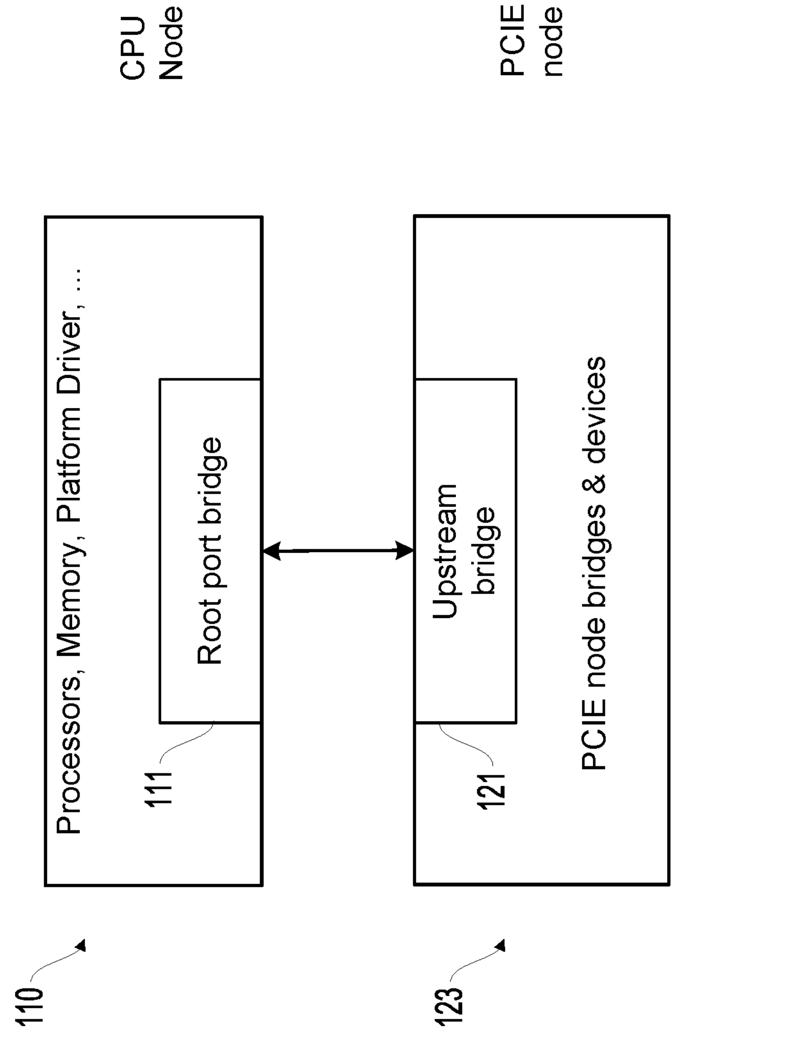
FIG. 1B is a block diagram of a PCIe node connected to a PCIe root port according to an exemplary embodiment of the disclosure.

In various embodiments, normal PCIe transactions include communication between PCIe nodes and a PCIe root port. In most embodiments, a computer's CPU contains a PCIe root port that includes a PCIe bridge and, in many embodiments, the PCIe bridge provides a connection from the CPU to a PCIe node. FIG. 1B is a block diagram of a PCIe node connected to a PCIe root port according to an exemplary embodiment of the disclosure. Refer now to the example embodiment of FIG. 1B, a block diagram of a PCIe node 123 connected to a PCIe root port of a computer system/compute node 110. The computer contains a CPU node 110 that includes a PCIe root port bridge 111 that is in communication with an upstream bridge 121 on the PCIe node 123.

Figure 2:
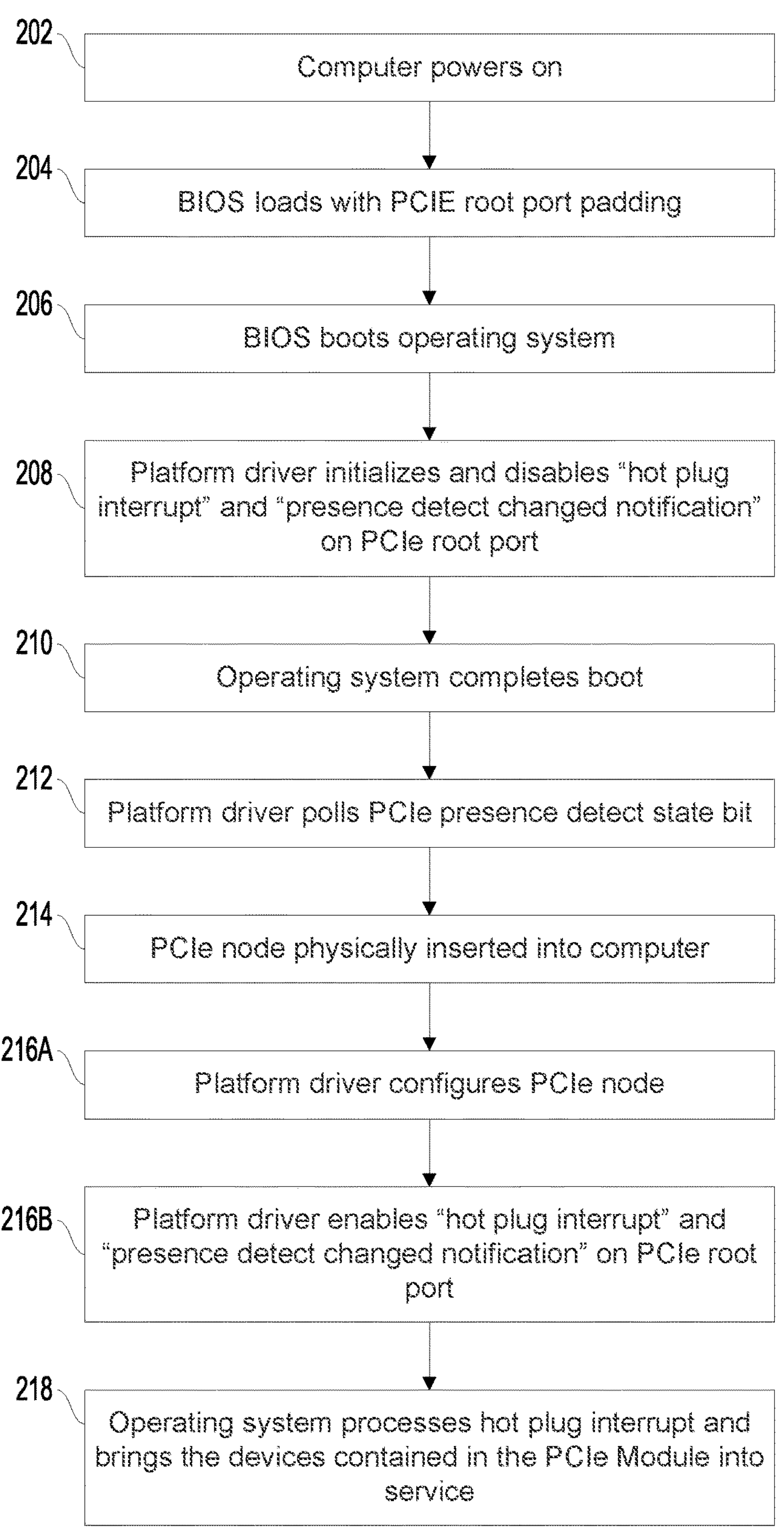
FIG. 2 is a flow chart depicting a method for preconfiguring a PCIe node according to an exemplary embodiment of the disclosure.

Refer now to the example embodiment of FIG. 2, a flow chart depicting a method for preconfiguring a PCIe node. In the method, a computer operable to accept a preconfigured PCIe node first powers on Step 202 and then loads a BIOS Step 204.

In some embodiments, a BIOS supports a PCIe root port resource padding (RPRP) feature and this feature is enabled in the BIOS. In many embodiments, when this feature is enabled, the BIOS will preconfigure the PCIe root port with adequate resources to support a PCIe node even when no PCIe nodes are currently connected. RPRP may be enabled as a feature in a given BIOS to allocate resources to the root port even when the root port does not have an attached PCIe Node (and thus does not have a current need for resources). In some embodiments, the platform driver 120 of FIG. 1A may be used to perform the various platform driver related steps 208 below.

In many embodiments, after the BIOS loads Step 204, the BIOS boots an operating system Step 206 and initializes a platform driver. In various embodiments, the platform driver initializes and disables "hot plug interrupt" and "presence detect changed notification" on PCIE root port Step 208. In most embodiments, on attaching a PCIe node to a computer, a PCIe root port will ordinarily trigger a hot plug interrupt that the operating system observes. In various embodiments, even when the PCIe root port does not generate a hot plug interrupt, the platform driver is aware of a newly inserted PCIe node by a polling process or by another process.

In some embodiments, after initializing the platform driver and/or the initializing and disabling "hot plug interrupt" and "presence detect changed notification" on PCIE root port, the operating system completes a boot process Step 210. In many embodiments, during normal operation of the operating system, the platform driver polls the PCIe "presence detect state" bit to detect an insertion of a PCIe node Step 212. In many embodiments, when a user physically inserts a PCIe node into the computer Step 214, the platform driver observes a change in the PCIe "presence detect state" bit. Because the platform driver had previously disabled the "hot plug interrupt" and the "presence detect changed notification" functions of the PCIe root port, the operating system will not be aware of a hot plug of the PCIe node.

In many embodiments, the platform driver will then preconfigure the PCIe node Step 216A. The platform driver will query the PCIe root port for its resource allocation, determine resources for the PCIe node, and provide allocated resources to bridges and devices that include the newly inserted PCIe node. In most embodiments, the preconfiguring process performed by the platform driver is substantially similar to the preconfiguring process that would otherwise be performed by the BIOS and would be familiar to a person of ordinary skill in the art.

In many embodiments, the platform driver then enables the "hot plug interrupt" and "presence detect changed notification" functions of the PCIe root port Step 216B, thus triggering a PCIe hot plug interrupt and a presence detect changed notification to the operating system. In some embodiments, enabling of these functions ("hot plug interrupt" and "presence detect changed notification") may be only temporary so that future unconfigured PCIe nodes may be similarly hot plugged. In various embodiments, the operating system processes hot plug interrupt and brings the devices contained in the PCIE Module into service Step 218. The operating system will detect the preconfigured PCIe node and then bring devices that are contained in the PCIe node into service.

In various embodiments, upon the completion of the self-enumeration process, the PCIe transmits a completion message to the operating system. Upon receipt, the operating system will detect the hierarchy of PCI bridges that have been enumerated. The operating system can then bring the PCI bridges and devices online for the computer system. Some of the embodiments disclosed herein may be used with fault tolerant systems that have a modular design that allows components to be replaced or for one or more components to take over for other components when a failure or error is detected that could impair the operation of one computer system or one or more devices used thereby. To accomplish high reliability in some fault tolerant computer systems frequently have redundant components such that when one component fails, begins to fail, or is predicted to fail, the programs using the failing computer component instead use a similar but redundant component of the system.

To minimize any downtime or other adverse effects for an end user, fault tolerant computer systems often have migration and failover capabilities. Modern computer systems also make use of high-performance peripherals that communicate through a PCIe ports. However, not all operating systems recognize PCIe modules that are inserted at run time due to the operating systems limitations. This can result in failure during live migration or failover processes in fault tolerant computer systems. In light of the foregoing, various embodiments of the disclosure may support device recognition, enumeration, and/or management in a hot swap scenario such as when a PCI device is failing or fails and a replacement needs to be added. Also, in many various embodiments of the disclosure may support device recognition, enumeration, and/or management as part of a live migration one computer system is failing and a secondary system is running to take over for the primary system.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding" or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of enabling hot plugging operations in a computer system, the method comprising:

- modifying firmware of a device;
- initializing a platform driver, wherein the platform driver is installed on a computer system running an operating system, wherein the operating system does not natively support hot plug functionality;
- disabling, using the platform driver, an interrupt function and a hardware detection notification function of the computer system;
- hot plugging a PCIe node in the computer system, wherein the PCIe node comprises the firmware and the device;
- detecting, using the platform driver, the hot plugging of the PCIe node in the computer system;
- configuring the PCIe node, using the platform driver, wherein the configured PCIe node comprises a PCI hierarchy, the PCI hierarchy comprising an allocation of PCI bridges and devices of the configured PCIe node;
- enabling, using the platform driver, an interrupt function and a hardware detection notification function of the computer system, wherein the platform driver handles one or more data exchanges between a kernel of the operating system and the platform driver; and
- bringing the devices of the hot plugged and configured PCIe node into service for use by the computer system.

2. The method of claim 1, wherein the PCIe node comprises hardware that is hot pluggable into the computer system.

3. The method of claim 2, wherein the PCIe node is not preconfigured.

4. The method of claim 3, wherein the interrupt function is a hot plug interrupt function.

5. The method of claim 4, wherein the hardware detection notification function is a presence detect changed notification function.

6. The method of claim 5, wherein the platform driver communicates with a PCIe root port of a central processing unit of the computer system to disable the hot plug interrupt function and the detection notification function.

7. The method of claim 3, wherein the step of detecting the hot plugging of the PCIe node comprises polling a PCIe presence detect state bit of the computer system.

8. The method of claim 5 further comprising enabling the interrupt function and the hardware detection notification function of the computer system.

9. The method of claim 8 further comprising triggering a detection of a hot plug interrupt and provision of a presence detect changed notification to the operating system.

10. The method of claim 9, wherein the triggering step comprises disabling the interrupt function and the hardware detection notification function of the computer system.

11. The method of claim 1, wherein the enabling, using the platform driver, an interrupt function and a hardware detection notification function of the computer system step is performed temporarily or for a brief time period to support detection of a hot plugged device.

12. The method of claim 11 further comprising processing the hot plug interrupt using the operating system.

13. The method of claim 12 further comprising detecting configuration of the PCIe node using the operating system.

14. The method of claim 3, wherein the computer system is operable to support PCIe root port resource padding.

15. The method of claim 7, wherein a change in the presence detect state bit indicates hot plugging of the unconfigured PCIe node.

16. The method of claim 1, wherein detecting, using the platform driver, the hot plugging of the PCIe node in the computer system further comprises polling a PCIe presence detect state bit using the platform driver.

17. The method of claim 1, wherein the device is a PCIe switch.

18. The method of claim 1, wherein the modified firmware is configured to support communicating with the platform driver using a communication channel established therebetween.

19. The method of claim 18 further comprising sending a memory range of a root bridge of the device to the modified firmware.

* * * * *